(12) United States Patent
Wynn

(10) Patent No.: US 11,764,726 B1
(45) Date of Patent: Sep. 19, 2023

(54) LIGHTWEIGHT BIMINI FOR CAPTURING SOLAR ENERGY

(71) Applicant: Nicholas Patrick Wynn, Redwood City, CA (US)

(72) Inventor: Nicholas Patrick Wynn, Redwood City, CA (US)

( * ) Notice: Subject to any disclaimer, the term of this patent is extended or adjusted under 35 U.S.C. 154(b) by 0 days.

(21) Appl. No.: 17/895,978

(22) Filed: Aug. 25, 2022

(51) Int. Cl.
*H02S 30/20* (2014.01)
*H02S 20/00* (2014.01)

(52) U.S. Cl.
CPC .............. *H02S 30/20* (2014.12); *H02S 20/00* (2013.01)

(58) Field of Classification Search
CPC ........... H02S 10/40; E04H 6/025; E04H 6/02; E04H 6/04
See application file for complete search history.

(56) References Cited

U.S. PATENT DOCUMENTS

| | | | |
|---|---|---|---|
| 2010/0108113 A1* | 5/2010 | Taggart ................... | F24S 20/67 135/96 |
| 2012/0090659 A1* | 4/2012 | Muchow ................. | H02S 30/20 136/245 |

* cited by examiner

*Primary Examiner* — Daniel P Malley, Jr.

(57) ABSTRACT

A device for simultaneous provision of shade and generation of solar power, suitable for deployment as a sailboat bimini or awning and a process for providing shade and generating solar power. The device includes multiple flexible solar panels, connected electrically, and bonded to rigid lightweight panels which are hinged together with restraints that prevent panel flexing or bending and thereby avoid propagation of microcracks in the solar cells, increasing longevity.

11 Claims, 7 Drawing Sheets

LIGHTWEIGHT BIMINI FOR CAPTURING SOLAR ENERGY

BACKGROUND

Recreational sailboats have a longstanding need for electrical power. Core functions, such as navigational instruments, use around 50 watts. An autopilot, essential for single-handed sailors, uses about 60 watts. Refrigeration, for food stored onboard, will use another 100 watts. Devices used intermittently, for example radio, radar, pumps, etc. add to this and can bring the daily electrical energy consumption to around 15 kilowatt hours.

This energy is conventionally supplied by batteries which are recharged intermittently either by dockside shore power, by the auxiliary engine, or by a small diesel-powered generator, if installed. Running the auxiliary engine at anchor can disturb neighbors and running a generator when sailing and the boat can heel, is not recommended. Both engines use fossil fuel and emit undesirable exhaust fumes, contributing to climate change. Wind turbines and hydro-generators are environmentally preferable but are normally only fitted to sailboats used predominantly offshore. Solar panels are silent and environmentally benign and are increasingly used to top up sailboat batteries. Most often power will be generated by panels installed on a purpose-built rack at the stern of the vessel or attached to railings at the cockpit sides. In these configurations power production is nevertheless restricted to 100-200 watts or so. Installing more panels would increase windage and degrade sailing performance. It could also prove dangerous in storm conditions.

Many sailboats, particularly those operating in southerly latitudes, are equipped with biminis, primarily to shade cockpit occupants. A well designed bimini will (i) provide adequate shade for the cockpit occupants, (ii) will be lightweight. (iii) will provide shelter from rain showers, (iv) will be easily deployed when needed, (v) can withstand moderate breeze and a boat's motion in waves and (vi) can be retracted manually and stowed quickly when wind speeds increase or when the boat is left unattended for long periods. A bimini's shade is provided by fabric extended primarily in a horizontal plane. This minimizes windage yet allows breeze through to cool people in the cockpit. It also provides a large horizontal area. For example, on a modern forty-foot sailboat the bimini area would be around 100-150 square feet. It is an object of this invention to use this area to generate solar power without compromising the essential attributes of a bimini outlined above.

Conventional solar panels, as used in residential applications, include an aluminum frame housing an array of solar cells, sandwiched between a layer of tempered glass and an encapsulant on the top side and an encapsulant and a back sheet on the back side. A standard 60 cell panel will hold sixty 6-inch×6-inch solar cells, will measure 39 inches×66 inches×1.5 inches thick and will weigh more than 40 pounds. It will generate around 280 watts under ideal conditions. These conventional solar panels are constructed with a rigid aluminum frame to support the front protective layer, a 3-4 millimeters thick sheet of tempered ultra-clear glass which protects the cells from weathering and impact. The frames are up to 1¾ inches thick, to prevent the glass and solar panel from flexing. The frame and glass account for around eighty percent of the weight of the panel.

Flexible or semi-flexible solar panels generally use a thinner silicon wafer, omit the aluminum frame, and use a thin polymer layer as a protective layer instead of glass. These panels are much lighter and thinner, come in a variety of shapes and can be mounted on slightly curved rigid surfaces, typically using adhesives. These flexible panels are also supplied for portable applications such as camping, where the panels are laid on the ground or temporarily affixed to a tent or even a backpack.

The lifespan of a solar panel depends on the quality of material used, the way a panel is assembled and handled as well as the conditions to which it is subjected in operation. Flexible panels generally have a lower lifespan because they are more susceptible to mechanical damage, either from surface impacts or propagation of microcracks from repeated flexing. Electronic performance is impaired, and dust, debris and water can penetrate the panel, causing further damage.

Flexible panels are sometimes bonded onto sailboat coach-roofs or pilothouses, where foot traffic is minimal, but generate only small amounts of power due to the limited installation area available.

Some sailboat biminis have been retrofitted with pouches where flexible panels can be inserted, although panels need to be removed prior to bimini retraction and stowage.

U.S. Pat. No. 10,560,050 B2 to Raghunathan (Evolusun Inc.) discloses an energy generating photovoltaic awning in which rigid solar panels are extended and rotated as the awning is deployed. The panels can be physically attached to each other and extend in a concertina fashion or be physically detached, providing gaps in the extended awning to minimize windage. Panels are flat when fully extended.

Kurlagunda et al describe a retractable photovoltaic charging system for vehicles in U.S. Pat. No. 10,439,549 B2. Hinged panels cantilever out from an enclosure mounted on the vehicle, using either a scissor, telescope or slide mechanism and are flat when fully extended.

These devices rely on panels sufficiently rigid to not flex when extended to the flat position. Such devices are not suited for provision of shade in sailboats. Conventional aluminum framed glass covered panels are far too heavy. Lightweight panels will flex repeatedly when flat in even moderate winds, leading to premature panel failure.

SUMMARY OF THE INVENTION

The invention disclosed herein can be used as a sailboat bimini or awning. The lightweight assemblies provide cockpit occupants with adequate shade and shelter from rain showers, are easily deployed, can withstand moderate breeze and a boat's motion in waves and can be retracted manually and stowed quickly when wind speeds increase. They will also generate electrical power when deployed in sunlight, providing sufficient power for navigational instruments, for powering an autopilot as well as powering a refrigerator.

The utility of the invention results from a unique geometry in which lightweight flexible solar panels are prevented from repeated flexing and resultant microcrack propagation by (i) bonding them to lightweight rigid panels. (ii) hinging the panels together in pairs, (iii) including restraints that prevent the panel-pairs from opening fully. Various embodiments of hinged assemblies of such panel-pairs are described below and will provide the benefits listed above over many years.

In one embodiment the assembly of panel-pairs is attached to a modified bimini frame, such that the panel-pairs are aligned athwartships and fold together into a compact stack when the bimini frame is collapsed. In a second embodiment the assembly of panel-pairs is set up with the panels aligned fore and aft in the boat. The corners of the panel-pairs are constrained to move in tracks such that panel-pairs can either be opened to provide an awning or closed to form a compact stack.

In a basic embodiment, the device includes the following elements:
(a) a number of lightweight, flexible solar panels, each with a length to width ratio of at least five;
(b) each of the solar panels being bonded to a lightweight rigid panel to form a composite panel;
(c) pairs of the resulting composite panels, hinged together along their long edge such that the solar panel faces can fold together to form panel-pairs;
(d) the panel-pairs being provided with restraints to prevent them from fully opening to form a flat surface;
(e) the panel-pairs being hinged together along their long edges to form a panel-pair assembly;
(f) the panels and panel-pairs being connected electrically so as to facilitate the panel-pair assembly generating photovoltaic electrical power;
(g) the panel-pair assembly being tied to either a bimini frame or awning tracks such that it can be easily either extended for deployment or folded into a compact stack when not required.

The flexible lightweight solar panels should neither include a glass panel nor a rigid frame. Such panels are available from multiple suppliers and typically consist of an array of thin solar cells connected electrically and sandwiched between polymer sheets. The back side of the panel can be coated with an adhesive to allow bonding to a surface which may be flat or curved in one direction. Typical panels are rated to generate around 150-180 watts per square meter, are about 2 millimeters thick and weigh around 2.3 to 2.5 kilograms per square meter.

The lightweight rigid panels can be multiwall sheets of extruded polymer or honeycomb, with flat surfaces on both sides to maximize stiffness. Polycarbonate is a good candidate material, of high strength, with good impact resistance and with reasonable UV resistance. Multiwall polycarbonate sheets from the company ePlastics are a suitable product, with a thickness of 10 millimeters and weight of 1.7 kilograms per square meter.

The hinges used to form panel-pairs and to connect panel-pairs may be multiple barrel hinges, suitably spaced, or continuous piano hinges, or living hinges of polymer or woven webbing. Panel pair hinges are installed such that panel-pairs will fold solar cell surfaces together. Hinges connecting panel-pairs fold completely in the other direction enabling all panels to concertina together into a stack.

The restraints preventing panel-pairs from flattening can be lengths of webbing attached to the hinges connecting panel-pairs at suitable intervals. A continuous restraint running the complete length of the panel can also be used. Direct restraints on hinge rotation which would unduly stress the hinges are not recommended.

The bimini frame can be of stainless-steel tubing, with multiple hoops, suitably hinged to fit the boat cockpit so as to allow the panels to collapse to a compact stack. Individual frames should include horizontal straight sections that align with the panel-pair assembly. Awning tracks may be aluminum profiles, as used in mainsheet tracks, bent to the required profile, and suitably supported, preferably by a permanent structure such as a pilot house or a boom gallows.

DETAILED DESCRIPTION OF THE INVENTION

The invention includes a device for generating electrical power for a sailboat while providing shade for the sailboat occupants and a method of generating electrical power for a sailboat and shade for the occupants. The device is an assembly of panel type components, connected using adhesive, hinges, fabric and electrical connections and fastened to a support frame mounted on a boat or vehicle.

Figure 1:
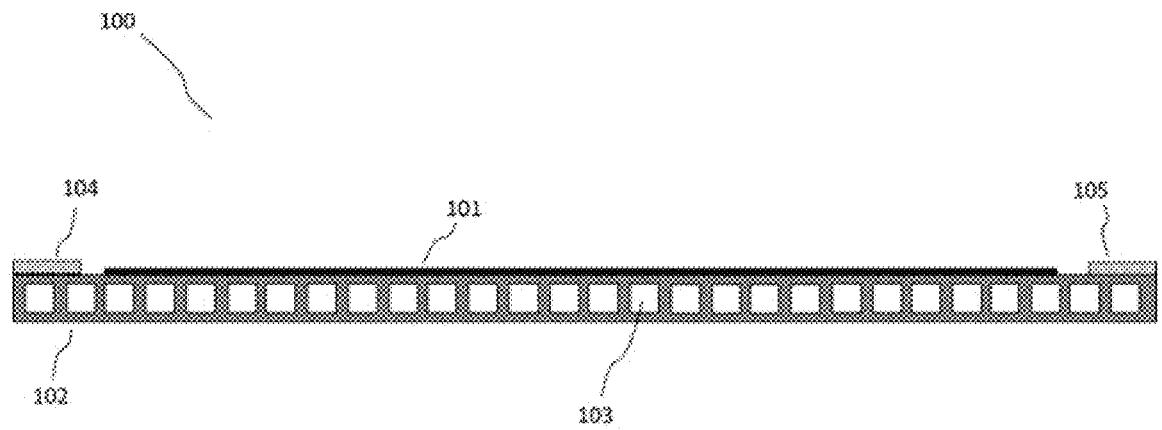
FIG. 1 shows a schematic cross section of a composite panel used in the device, comprising a flexible solar panel bonded to a rigid lightweight support panel.

FIG. 1, generally indicated by numeral 100, shows an end view of a composite panel, 100, assembled by bonding a lightweight, flexible solar panel, 101, to one face of a lightweight rigid panel, 102. The flexible solar panel contains an array of thin and lightweight flexible photovoltaic solar cells, electrically connected, and encapsulated between thin sheets of polymer, most often ethyl vinyl acetate (EVA). The solar cells are typically crystalline silicon wafers, sliced to a few micrometers thick, but other lightweight flexible photovoltaic cells can be used.

The rigid panel is of multiwall construction, including channels. 103, providing stiffness while minimizing panel weight. The panel may be any material but an extrudable material is preferred, for example aluminum, or a high strength thermoplastic such as polycarbonate. The flexible solar panel is narrower than the rigid panel supporting it, leaving space on each side for spacer strips. 104, 105, which are bonded to the edges of the rigid panel. The spacer strips are thicker than the flexible solar panel.

Figure 2:
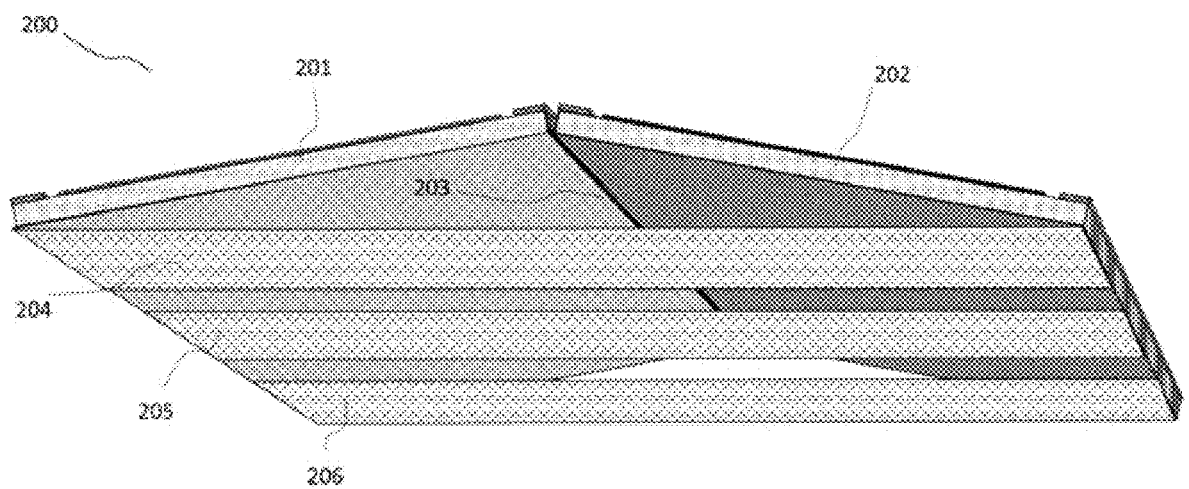
FIG. 2 shows a representation of a hinged pair of composite panels, fitted with restraints to maintain some angulation when tensioned.

FIG. 2, generally indicated by numeral 200, shows a panel-pair according to the invention. A panel-pair is formed by hinging together two composite panels, 201, 202, along their long edges, with the axis of the hinge, 203, located along the faces of the panels not covered with solar panels, such that the panel-pair can fold together, leaving the solar panels exposed on the outside of the folded panel-pair. The hinge may be a single piano hinge as shown in FIG. 2, or multiple barrel hinges spaced uniformly, or a fabric or polymer hinge. In FIG. 2 the extent of panel-pair opening is shown restrained by three restraining straps, 204, 205, 206, attached at each end to the open edges of the composite panels and spaced uniformly. Any number of restraining straps can be used for the invention, including a single fabric sheet extending along the complete panel length. The optimum number of straps will depend on the stiffness of the composite panels used in the device.

Figure 3:
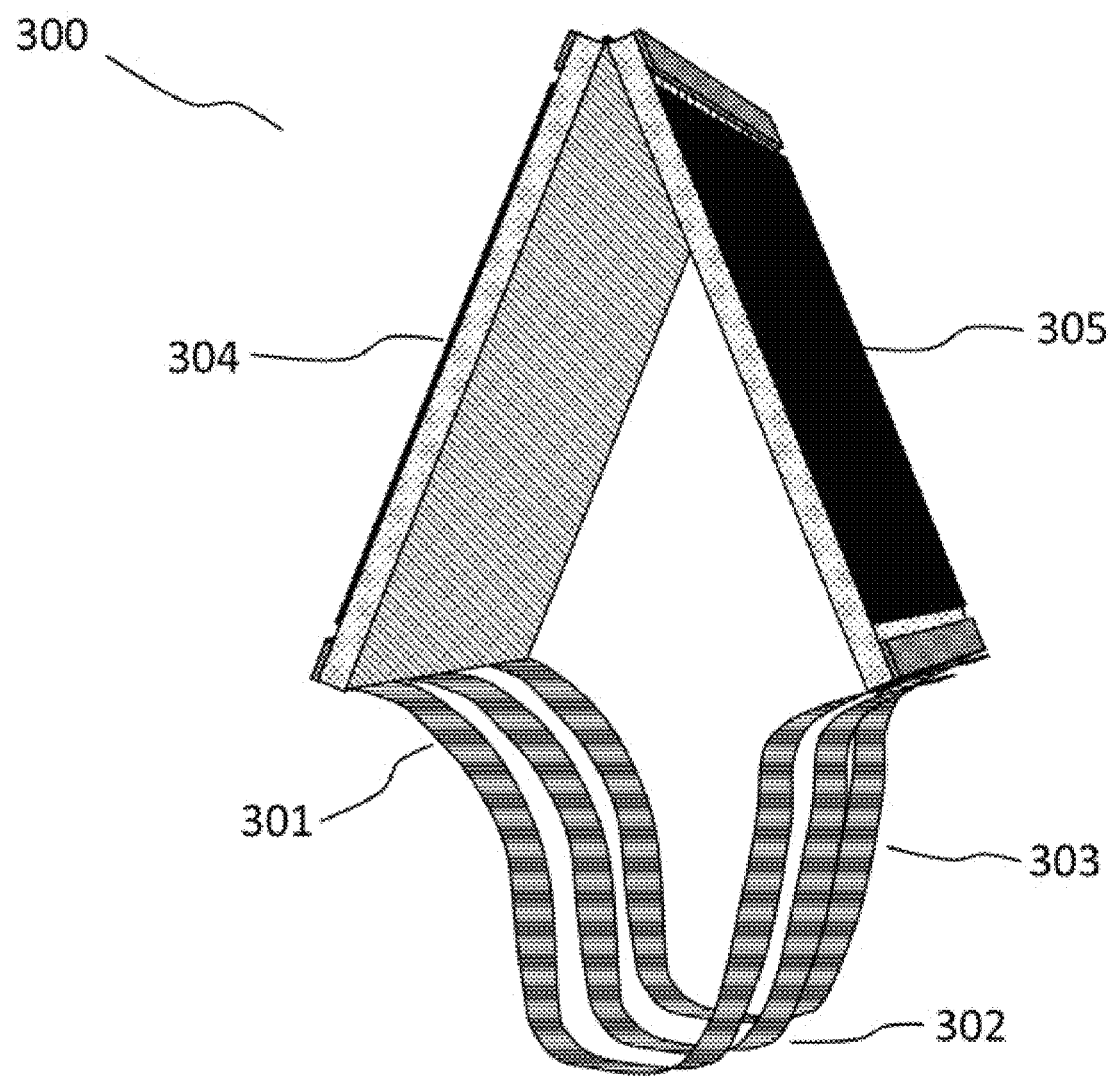
FIG. 3 shows the panel-pair of FIG. 2, partially folded.

FIG. 3, generally indicated by numeral 300, shows the panel-pair partially folded with the restraining straps 301, 302, 303 slack and the faces with the flexible solar panels, 304, 305, on the outside of the partially folded panel-pair.

The objective of restraining the panel-pair opening is to minimize any flexing or bending of the panels. This effect is shown quantitatively in FIG. 4, generally indicated by numeral 400, where the percentage increase in bending stiffness of two example panel-pairs is plotted against the included angle between the panels. The percentage increase in bending stiffness is expressed as (1-BR/BF)×100, where BR is the bending stiffness of a restrained panel-pair and BF is the bending stiffness of the same panel-pair when unrestrained and flat.

Figure 4:
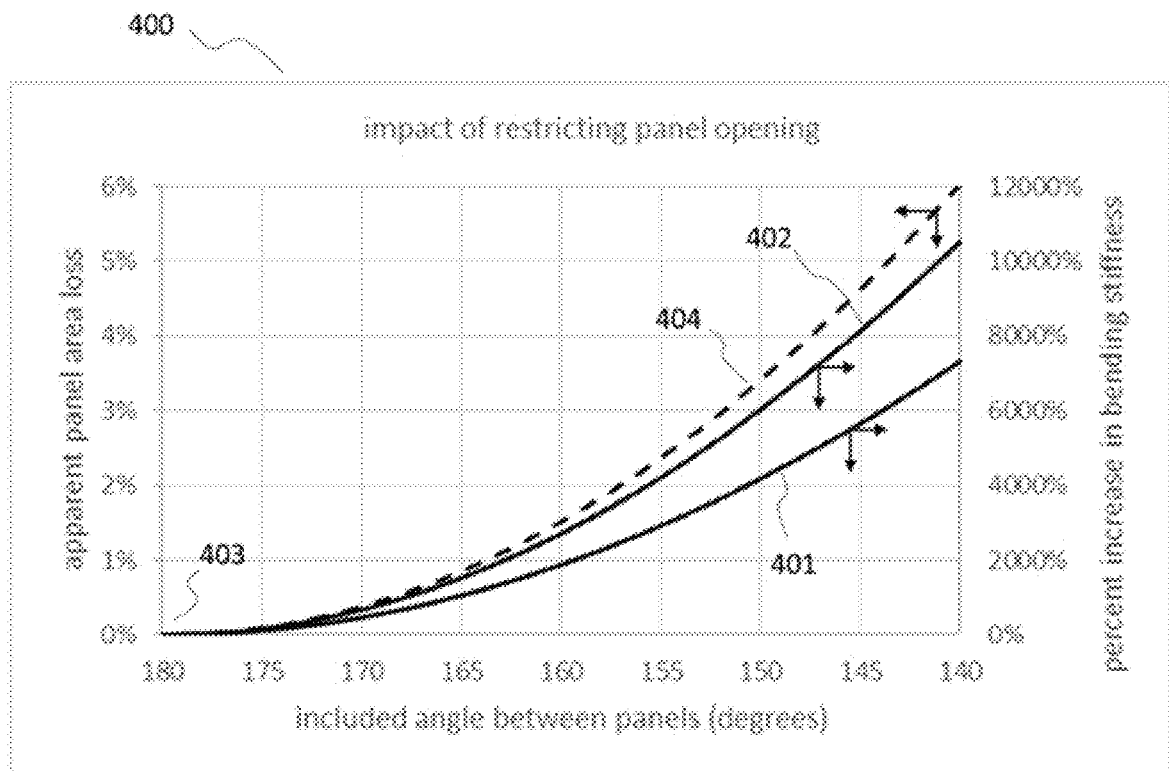
FIG. 4 shows graphically how maintaining the angulation of a composite panel-pair hugely increases bending stiffness with only a minor penalty in effective panel area.

The two example panel-pairs differ only in the width to thickness ratio of the panels. The lower plot, 401, is for panels with a width to thickness ratios of 20. The upper plot, 402, is for panels with a width to thickness ratio of 25. FIG. 4 shows that the more the restraints reduce the angle between the panels, the more the panel-pair bending stiffness increases. For an included angle of 140 degrees, the bending stiffness increase is dramatic, between 7,000% and 10,500%, a factor of 70 to 105. Bending stiffness directly impacts how much the composite panels, including the solar cells, will flex under the varying mechanical loads arising from wind gusts and the boat's motion in a seaway. Increased stiffness reduces panel flexing, preventing microcrack propagation, avoiding impairment of electronic performance preventing dust, debris, and water from penetrating the panel and causing further damage and thus extending solar panel life.

The slight downside of restraining panel opening is also shown in FIG. 4. The dashed plot, 404, shows how sloping the panels from the horizontal is equivalent to losing apparent panel area and thereby reducing solar power capture. However, compared to the benefit in increased panel stiffness, this effect is minor. Even with an included angle between panels of 140 degrees, only 6% apparent panel area is lost.

Figure 5:
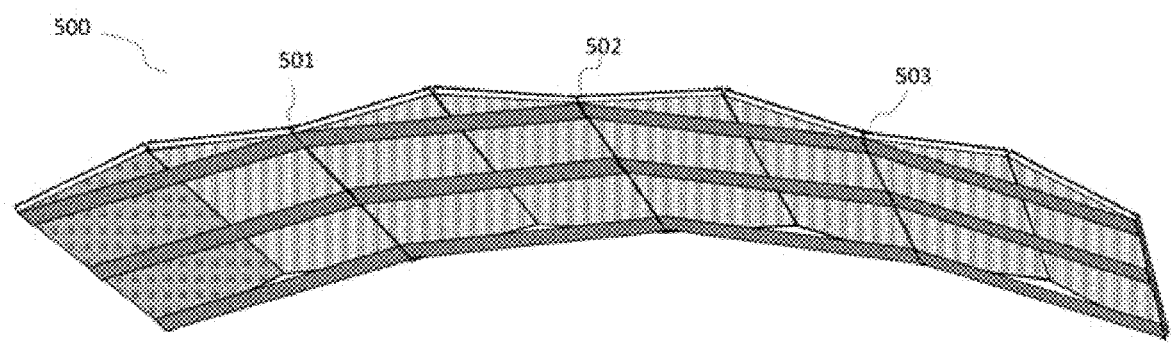
FIG. 5 shows how four panel-pairs can be hinged together to form a multi panel assembly.

FIG. 5, generally indicated by numeral 500, shows four panel-pairs hinged together to form a panel assembly for use in a solar bimini or solar awning. The panel-pairs are connected by three hinges, 501, 502, 503. Each hinge may be a single piano hinge as shown in FIG. 5, or multiple barrel hinges spaced uniformly, or a fabric or polymer hinge. The hinge axes are fixed at a point between the panel-pairs which is level with the outside face of the spacer strips that are bonded to the rigid panels, adjacent to the solar panels. This ensures that the panel assembly can be completely folded as shown in FIG. 6

Figure 6:
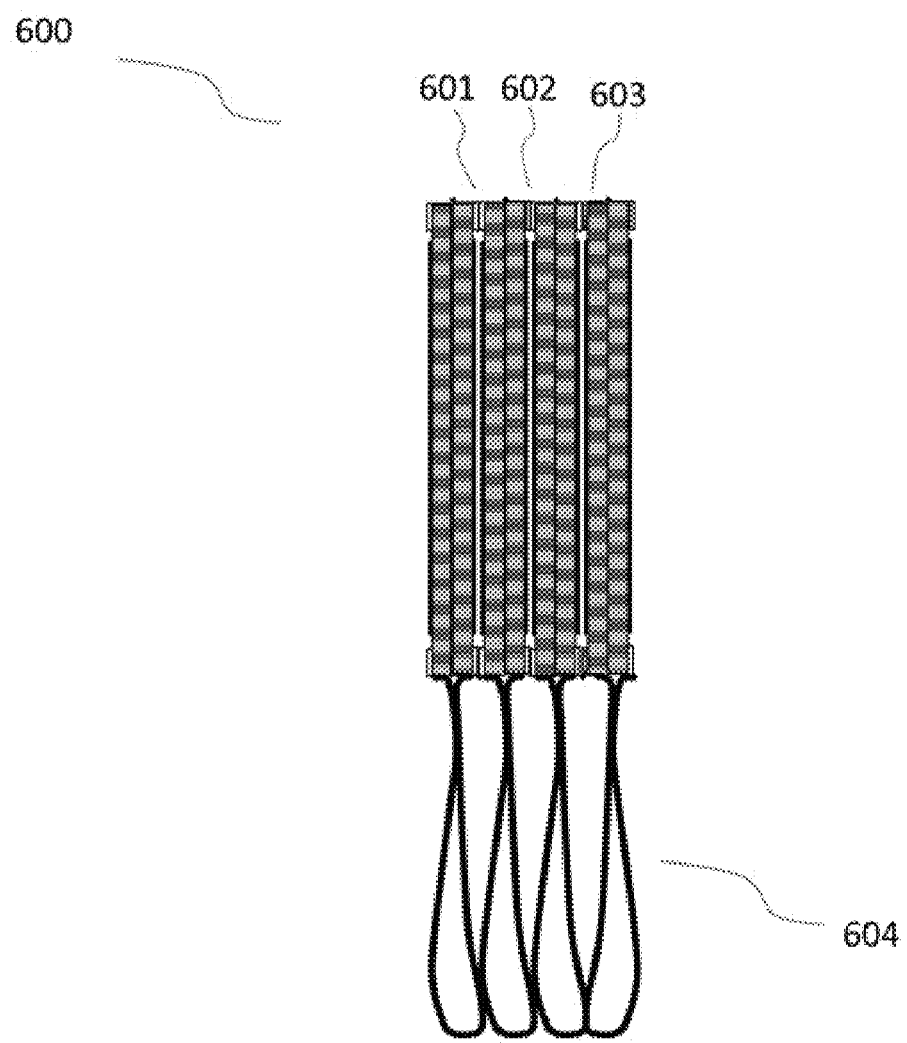
FIG. 6 shows how the multi panel-pair assembly of FIG. 5 can be folded into a stack.

FIG. 6, generally indicated by numeral 600, shows the four panel-pair assembly of FIG. 5 folded together. The spacers, 601, 602, 603, on the photovoltaic faces of the panel-pairs prevent the solar panels from contacting each other, avoiding damage when the assembly is retracted and stowed. The four sets of restraining straps, 604, hang beneath the folded panel assembly.

Figure 7:
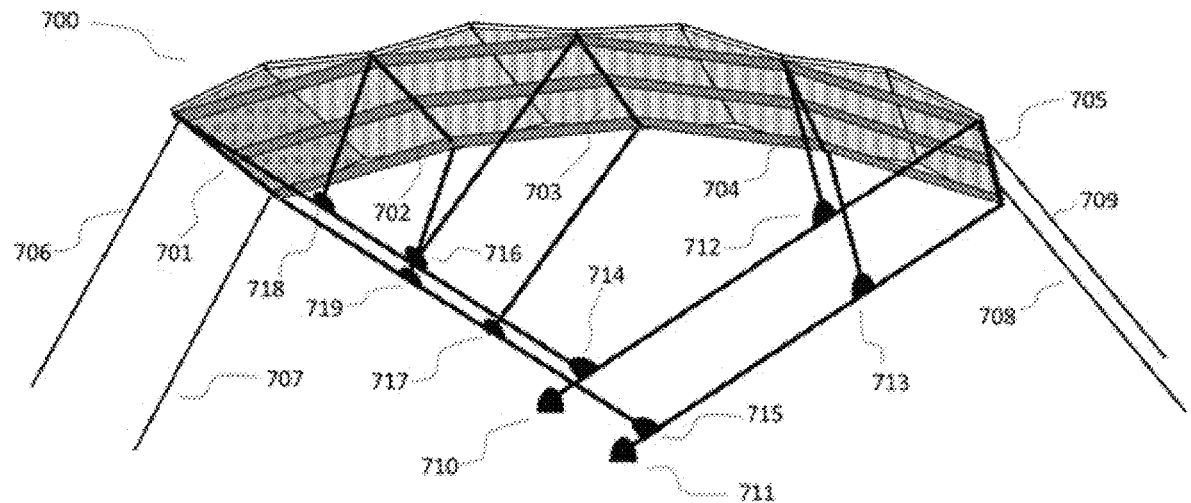
FIG. 7 shows how the multi panel-pair assembly of FIG. 5 can be attached to a bimini frame.

FIG. 7, generally indicated by numeral 700, shows the four-panel-pair assembly, 701, installed on a five open-hoop bimini frame and seen from below. The bimini frame is attached to the panel-pair assembly at the open-hoop crossbars 701, 702, 703, 704 and 705. The attachment method can be by using ties, or by using fabric sleeves attached to the hinged joint between panel-pairs, or by another suitable method. The attachment method should allow the panel-pair assembly to be removed from the bimini frame for repair, for example, but need not be removed to collapse and stow the solar bimini. The bimini is deployed by tensioning strap pair 706, 707, and strap pair 708, 709, which connect to the deck or coaming of the boat. The bimini is collapsed by releasing one pair of these tension straps and folding the pivoted open hoops about deck-mounted pivots 710, 711 and framemounted pivots 712, 713, 714, 715, 716, 717, 718, 719.

Figure 8:
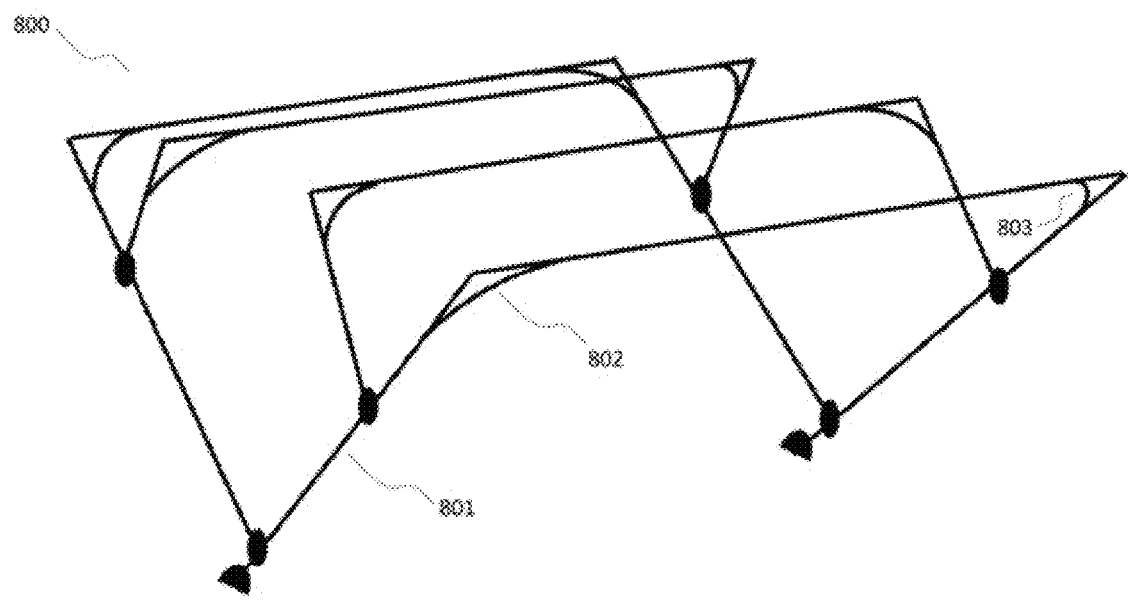
FIG. 8 shows a reinforced bimini frame, recommended for use in one embodiment of the invention.

FIG. 8, generally indicated by numeral 800, shows a four open hoop bimini frame which includes a modification to a conventional bimini frame, especially for use with the invention. Conventional bimini frames generally include open hoops of continuous sections of bent stainless steel tubing. A multiple panel-pair assembly according to the invention needs to be supported by horizontal straight sections in the bimini open hoops. Simple rectangular open hoops would provide this, but are prone to sideways deflection because stresses are concentrated at the corners, The bimini open hoops shown in FIG. 8 include bent tubing reinforcement at the corners of the open hoops. Open hoop 801, for example, includes reinforcement elements 802, 803.

Figure 9:
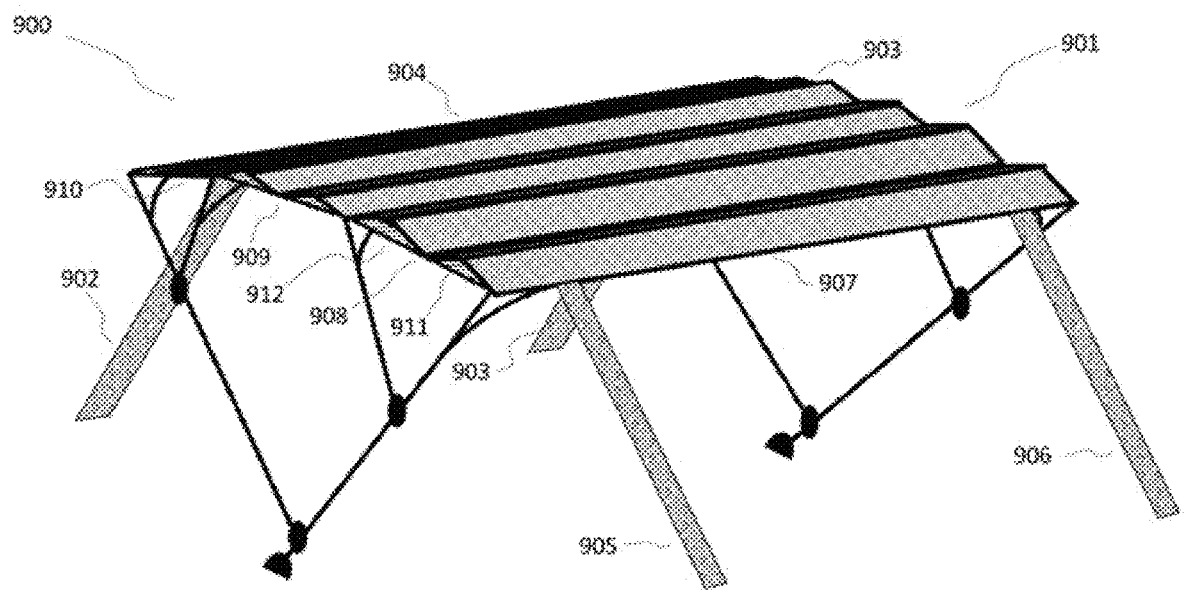
FIG. 9 shows how a five panel-pair panel assembly can be attached to the bimini frame of FIG. 8.

FIG. 9, generally indicated by numeral 900, shows a six-panel-pair assembly, 901, installed on a four open-hoop bimini frame and seen from above. The bimini is tensioned using tension straps 902, 903, which rotate back open hoop, 904, towards the deck and tension straps 905, 906 which rotate front open hoop, 907, in the other direction towards the deck. In this embodiment two panel-pairs span across adjacent open hoops, so the panel assembly is not attached to the bimini frame at panel joints 908, 909, 910. Sufficient tensioning of the frame will cause pairs of panel restraints, for example restraints 911, 912, to line up to create a stable structure.

Figure 10:
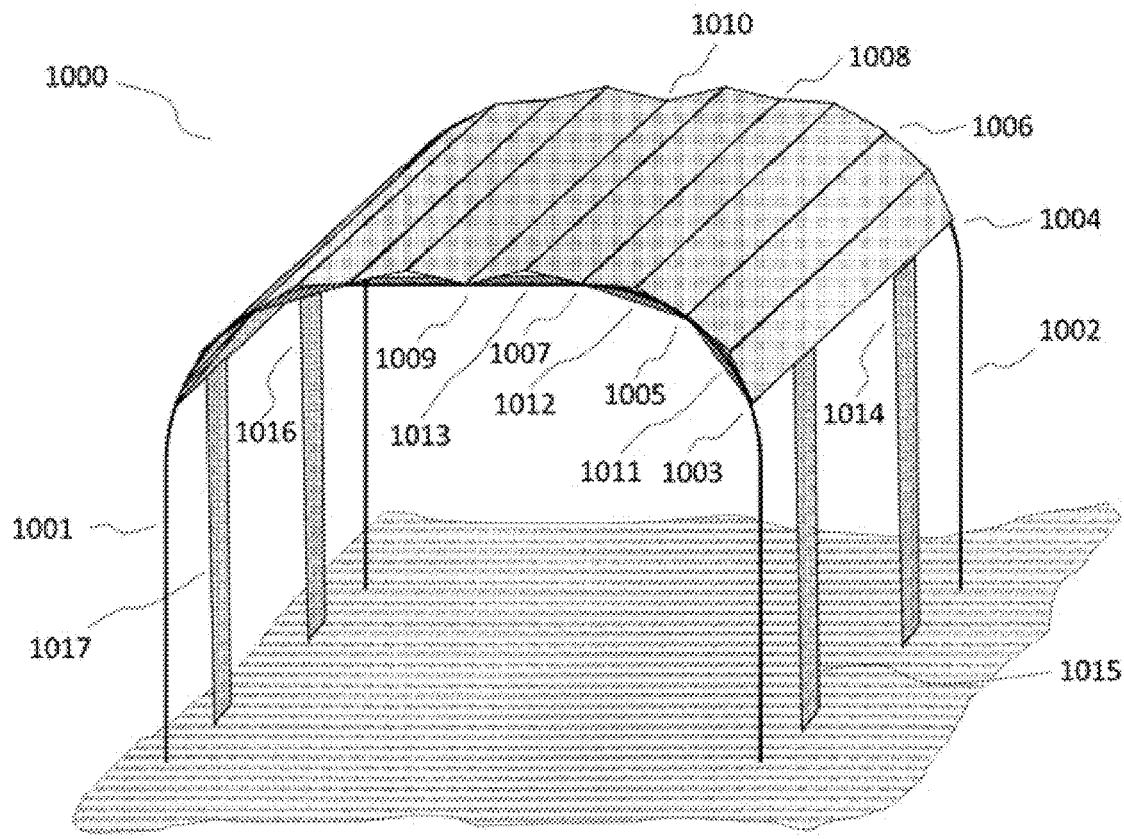
FIG. 10 shows how fixed support tracks can be used to support a solar canopy consisting of multiple panel-pairs.

FIG. 10, generally indicated by numeral 1000, shows a multi panel-pair assembly, according to the invention, deployed on a fixed frame to provide a solar canopy. Joints between panel-pairs are attached to the two fixed-frame open hoops, 1001, 1002 with slides, for example at locations 1003, 1004, 1005, 1006, 1007, 1008, 1009, 1010. As in all other depictions of the invention, panel-pairs are restrained from fully opening by restraining straps, for example straps 1011, 1012, 1013. As in previous cases, a rigid structure results, preventing solar panel flexing which would adversely affect panel life.

Panel pair restraints are tensioned using tension straps 1014, 1015, 1016, 1017. By adjusting the length of these tension straps, the whole solar panel assembly may be moved laterally in the slides, to shade one or the other sides of the canopy, or to better catch the sun for generation of photovoltaic power.

Figure 11:
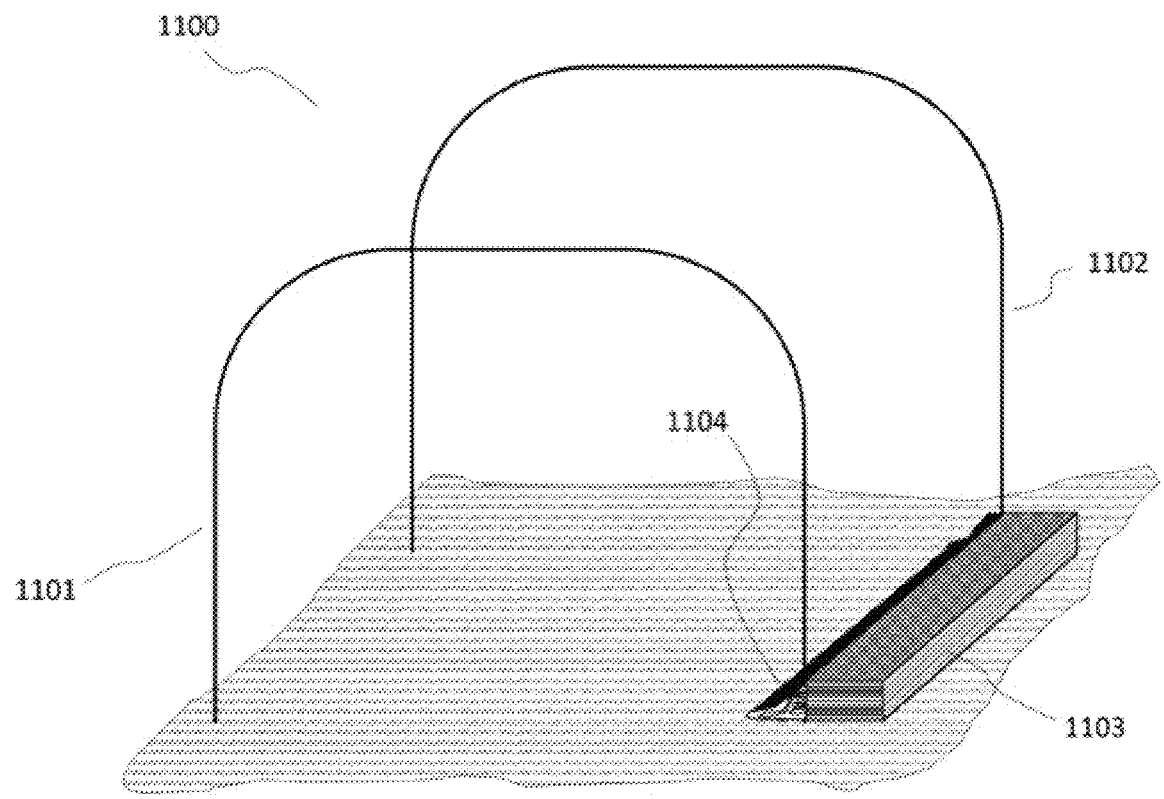
FIG. 11 shows how the solar canopy of FIG. 10 can be collapsed into a stack.

FIG. 11, generally indicated by numeral 1100, shows the invention embodiment of FIG. 10 with the two fixed frame open hoops, 1101, 1102 in the same position, but with the panel assembly collapsed in a stack, 1103, and with restraining straps, 1104, lying slack. The panel assembly is still attached to the frame open-hoops by the slides at each joint between panel-pairs. This configuration is easily and quickly achieved by slackening one pair of tension straps and moving the complete multi panel assembly to the other side of the frame. Releasing the restraining straps then allows the complete assembly of panel-pairs to collapse into a stack, as shown.

I claim:

1. A collapsible lightweight device for providing shade and generating photovoltaic power, comprising:
(a) flexible solar panels, less than 4 millimeters thick, with each solar panel bounded by a pair of spacer strips, thicker than the solar panel, with each solar panel and spacer strip pair bonded to a rigid, multiwall, rectangular panel, of length to width ratio greater than five, to form a composite panel with two long edges and two short edges;
(b) pairs of the composite panels, hinged together along one of the long edges of each composite panel, such that the resulting composite panel pairs can fold completely with the solar panels on the outside of the folded composite panel pairs and fitted with one or more restraining straps preventing the composite panel pairs from fully opening, with the maximum allowable opening selected in the range of 140 to 170 degrees from the fully folded position;
(c) an assembly of many such composite panel pairs, hinged together along their long edges and fitted to a support frame consisting of two or more open hoops, with panel pairs arranged such that the assembly can be collapsed into a stack, with all solar panels connected electrically.

2. The device of claim 1, wherein the support frame consists of multiple symmetrical open hoops with horizontal sections, with each open hoop able to pivot about a horizontal axis joining the open ends of the hoops, with all the horizontal axes disposed parallel to each other, with the horizontal sections of each hoop attached to the hinges joining panel pairs or to the hinged edges of the panel pairs.

3. The device of claim 1, wherein the support frame consists of two identical symmetrical open hoops, disposed to stand vertically and parallel to each other, with each open hoop providing a track, with each track guiding slides attached to the adjacent corners of each hinged panel pair.

4. The device of claim 1, wherein the flexible solar panels contain multiple solar cells, connected electrically and encapsulated with polymer resulting in a panel with a thickness less than 4 millimeters.

5. The device of claim 1, wherein the lightweight rigid multiwall panels are extruded polymer, with a thickness greater than 5 millimeters and a weight less than 2 kg/m$^2$.

6. The device of claim 5, wherein the polymer is polycarbonate.

7. The device of claim 1, wherein the restraining straps are nylon webbing or ultra-high-molecular-weight-polyethylene (UHMWPE) webbing.

8. The device of claim 1, wherein the hinges are nylon or ultra-high-molecular-weight-polyethylene (UHMWPE) webbing.

9. The device of claim 1, wherein the hinges are piano type hinges, continuous along the length of the panels.

10. The device of claim 1, wherein multiple barrel hinges are used and are spaced along the length of the panels.

11. A process for simultaneously generating electrical power from sunlight and providing shade for the occupants of a boat, comprising:
(a) providing flexible solar panels, less than 4 millimeters thick, with each solar panel bounded by a pair of spacer strips, thicker than the solar panel, with each solar panel and spacer strip pair bonded to a rigid, multiwall, rectangular panel, of length to width ratio greater than five, to form a composite panel with two long edges and two short edges;
(b) hinging pairs of the composite panels together along one of the long edges from each composite panel, such that the resulting composite panel pair can fold completely to form a folded composite panel pair with the solar panels on the outside of the folded composite panel pair and fitting one or more restraining straps, preventing the composite panel pair from fully opening, with the maximum allowable opening selected in the range of 140 to 170 degrees from the fully folded position;
(c) joining multiple such composite panel pairs with hinges along their long edges and fitting the resulting assembly to a support frame consisting of two or more open hoops, with the composite panel pairs arranged such that the assembly can be collapsed into a stack;
(d) connecting all solar panels electrically;
(e) installing the resulting assembly into a frame to support it in the extended position so as to provide shade and capture solar power.

\* \* \* \* \*